United States Patent
Liu

(10) Patent No.: US 9,727,818 B1
(45) Date of Patent: Aug. 8, 2017

(54) IMPRESSION EFFECT MODELING FOR CONTENT ITEMS

(71) Applicant: Google Inc., Mountain View, CA (US)

(72) Inventor: Yifang Liu, Redwood City, CA (US)

(73) Assignee: Google Inc., Mountain View, CA (US)

( * ) Notice: Subject to any disclaimer, the term of this patent is extended or adjusted under 35 U.S.C. 154(b) by 690 days.

(21) Appl. No.: 14/187,291

(22) Filed: Feb. 23, 2014

(51) Int. Cl.
*G06N 5/02* (2006.01)

(52) U.S. Cl.
CPC ..................... *G06N 5/02* (2013.01)

(58) Field of Classification Search
None
See application file for complete search history.

(56) References Cited

U.S. PATENT DOCUMENTS

| | | | |
|---|---|---|---|
| 6,772,129 | B2 | 8/2004 | Alvarez et al. |
| 8,175,914 | B1 * | 5/2012 | Benson ............... G06Q 10/025 705/14.41 |
| 8,423,406 | B2 | 4/2013 | Briggs |
| 8,438,170 | B2 | 5/2013 | Koran et al. |
| 8,504,575 | B2 | 8/2013 | Koran et al. |
| 8,682,895 | B1 * | 3/2014 | Goel ................. G06F 17/30705 707/732 |
| 8,880,438 | B1 * | 11/2014 | Liu ..................... G06N 99/005 706/12 |
| 2008/0262917 | A1 * | 10/2008 | Green ................... G06Q 30/02 705/14.71 |
| 2009/0119172 | A1 * | 5/2009 | Soloff .................. G06Q 30/02 705/344 |
| 2011/0040636 | A1 * | 2/2011 | Simmons ............... G06Q 30/02 705/14.71 |
| 2012/0022937 | A1 | 1/2012 | Bhatia et al. |
| 2012/0290599 | A1 | 11/2012 | Tian et al. |
| 2013/0018719 | A1 | 1/2013 | Abraham et al. |
| 2013/0066725 | A1 * | 3/2013 | Umeda ............... G06Q 30/0275 705/14.66 |

(Continued)

FOREIGN PATENT DOCUMENTS

WO WO-2013/036957 3/2013

OTHER PUBLICATIONS

Sundar, S. Shyam, and Sriram Kalyanaraman. "Arousal, memory, and impression-formation effects of animation speed in web advertising." Journal of Advertising 33.1 (2004): 7-17.*

(Continued)

*Primary Examiner* — Kakali Chaki
*Assistant Examiner* — Daniel Pellett
(74) *Attorney, Agent, or Firm* — Foley & Lardner LLP; John D. Lanza; James De Vellis

(57) ABSTRACT

The modeling of an impression effect may include generating a content item impression effect distribution. A classification model may be used to determine a period of the content item impression effect distribution based on one or more accessed impression effect parameters. A value for a content item may be determined based, at least in part, on the determined period and a bid associated with the content item. A content item may be selected based on the determined value and data to display the selected content item may be transmitted. In some instances, the determined period may be used to determine or select predictive model for the determined period that outputs a factor to modify the determined value.

20 Claims, 6 Drawing Sheets

(56) References Cited

U.S. PATENT DOCUMENTS

| | | | |
|---|---|---|---|
| 2013/0246323 A1* | 9/2013 | Athas | G06N 5/02 706/46 |
| 2014/0032306 A1* | 1/2014 | Sukornyk | G06Q 30/02 705/14.43 |
| 2015/0170222 A1* | 6/2015 | Els | G06Q 30/0275 705/14.71 |

OTHER PUBLICATIONS

Ghosh, Arpita, et al. "Bidding for representative allocations for display advertising." International Workshop on Internet and Network Economics. Springer Berlin Heidelberg, 2009.*

* cited by examiner

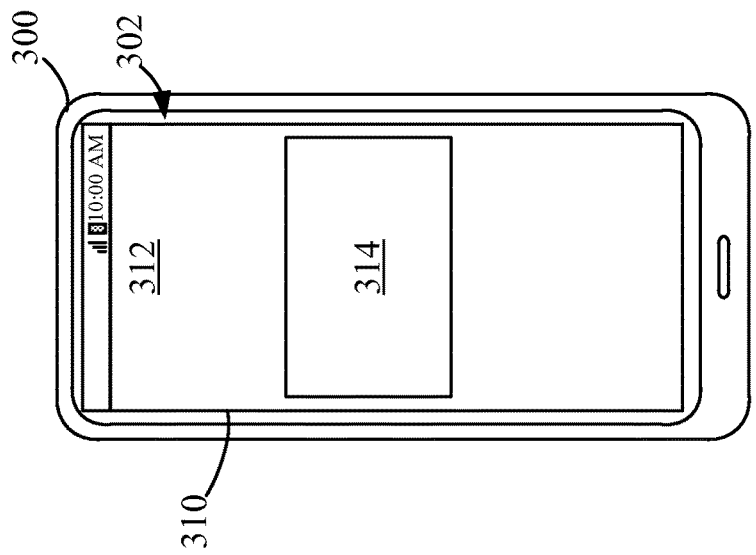
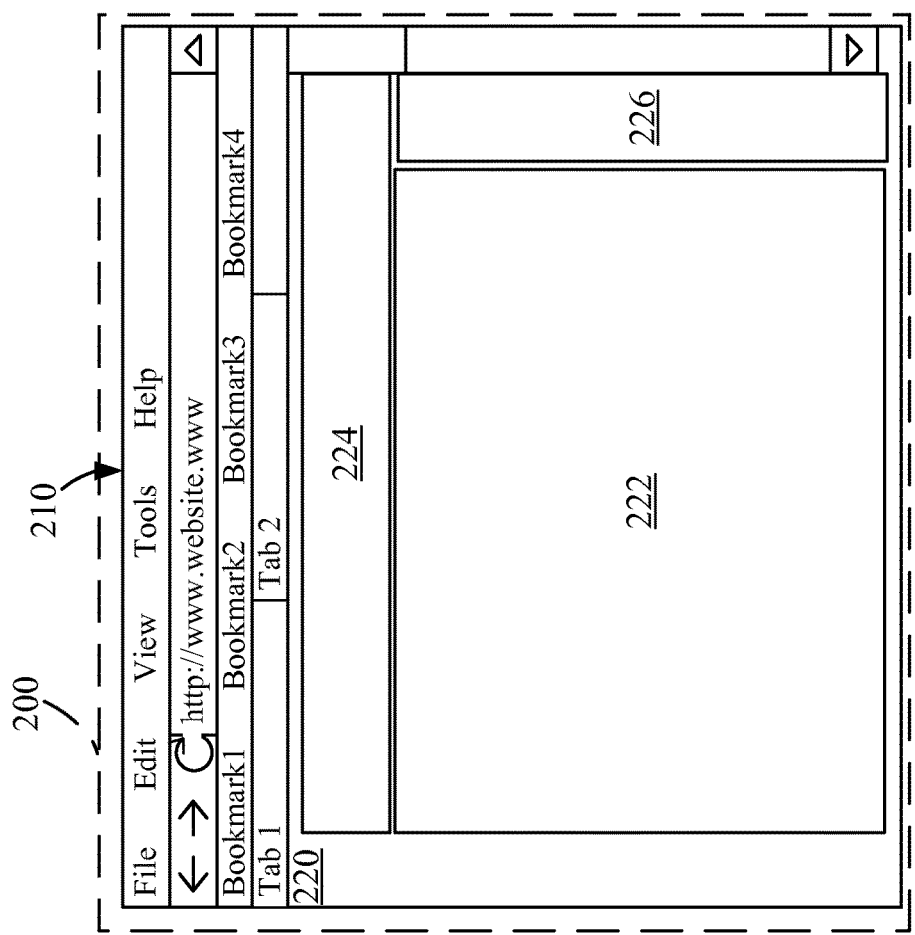
FIG. 3
FIG. 2

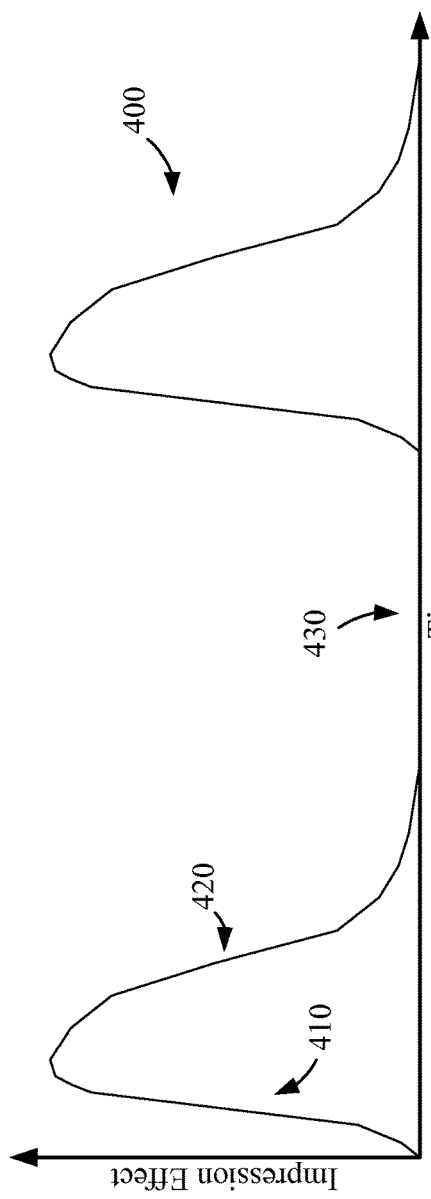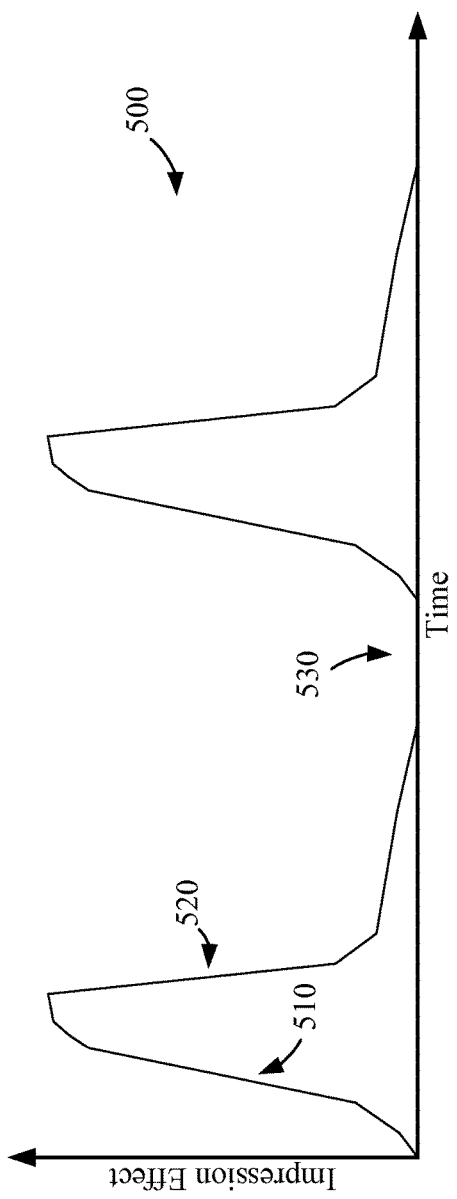

IMPRESSION EFFECT MODELING FOR CONTENT ITEMS

BACKGROUND

In a networked environment, such as the Internet or other networks, first-party content providers can provide information for public presentation on resources, for instance webpages, documents, applications, and/or other resources. The first-party content can include text, video, and/or audio information provided by the first-party content providers via, for instance, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For instance, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to modeling an impression effect, including the accumulation, decay, and rebuilding of demand thereof. The modeling of the impression effect may be used in determining whether to select a content item, such as through the use of a predictive model. After a content item, for instance an advertisement, is served to be presented with a resource to a user of a client device, the content item may have an effect on the user of a client device viewing the content item, such as an impression effect. For instance, the serving of a content item may initially pique the interest of a user of a client device such that subsequent presentations of the content item may further interest the user of a client device. The impression effect may reach a maximum and, as time elapses, the effect of the impression may fade as the user of a client device may forget about the content item or may not currently be interested. After a period of time, such as a demand rebuilding period, subsequent presentation of the content item may re-engage the user of a client device to accumulate interest again. The modeling of the impression effect accumulation, decay, and rebuilding of demand may be useful to assist in selecting and serving content items to increase the likelihood of a user of a client device engaging with and/or converting for the content item.

One implementation relates to a method of selecting and serving a content item. The method includes accessing one or more impression effect parameters representative of a context for selecting and serving a content item stored in a data structure and determining a period of a content item impression effect distribution representative of a demand for impressions over time for the content item using a classification model and the accessed one or more impression effect parameters. The method also includes determining a value for the content item based, at least in part, on the determined period and a bid associated with the content item and selecting the content item based, at least in part, on the determined value. The method further includes transmitting data to display the selected content item.

Another implementation relates to a system for serving content items in content item slots. The system may include one or more processing modules and one or more storage devices. The one or more storage devices includes instructions that cause the one or more processing modules to perform several operations. The operations include accessing one or more impression effect parameters representative of a context for selecting and serving a content item stored in a data structure and determining a classification model for a content item of a set of content items for an auction. The operations also include determining a period of a content item impression effect distribution representative of a demand for impressions over time for the content item based on the determined classification model and the accessed one or more impression effect parameters. The operations further include determining a value for the content item based, at least in part, on the determined period and a bid associated with the content item and selecting the content item from the set of content items for the auction based, at least in part, on the determined value. The operations still further include transmitting data to display the selected content item.

Yet a further implementation relates to a computer readable storage device storing instructions that, when executed by one or more processing modules, cause the one or more processing modules to perform several operations. The operations may include accessing one or more prior impression effect parameters associated with a content item and one or more prior impression effect parameters associated with a client device. The operations also include generating a content item impression effect distribution representative of a demand for impressions over time for the content item based, at least in part, on the one or more prior impression effect parameters associated with a content item and the one or more prior impression effect parameters associated with a client device. The operations further include generating a classification model based on the generated content item impression effect distribution. The classification model may be configured to determine one or more periods of the content item impression effect distribution based on one or more impression effect parameters. The operations still further include generating a predictive model for a period of the one or more periods of the content item impression effect distribution based, at least in part, on the one or more prior impression effect parameters associated with a content item and the one or more prior impression effect parameters associated with a client device. The predictive model may output a factor to modify a score of a content item responsive to one or more impression effect parameters.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2 is an illustration of an implementation of a first-party resource having third-party content;

FIG. 3 is an illustration of an implementation of another first-party resource displayed on a mobile device and having third-party content;

FIG. 4 is a graphical diagram depicting an impression effect over a time period;

FIG. 5 is a graphical diagram depicting another impression effect over a time period;

Figure 1:
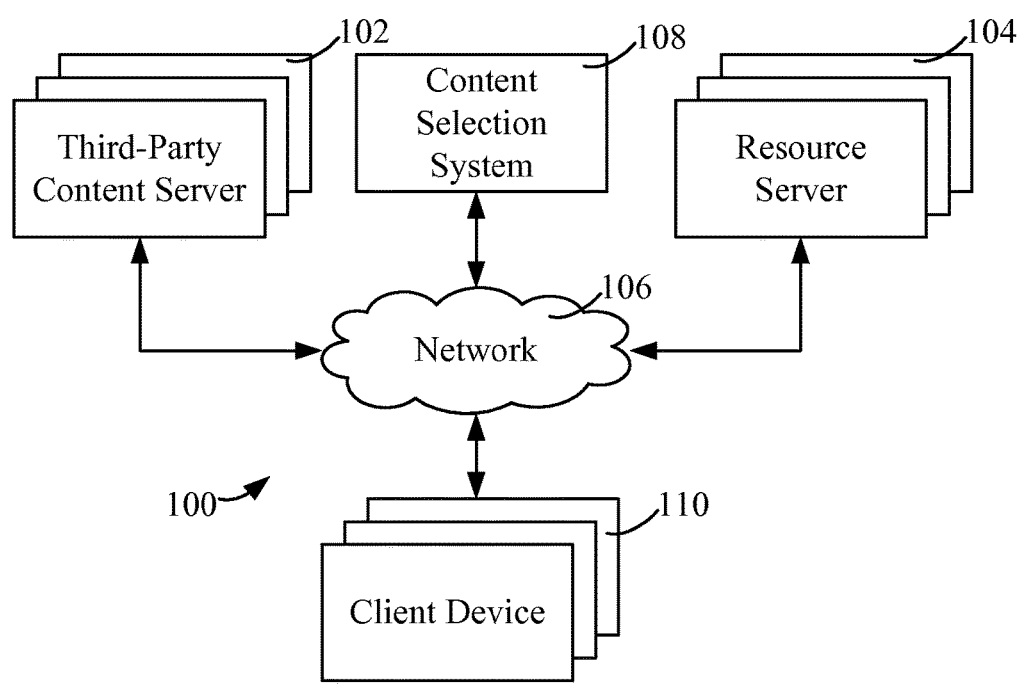
FIG. 1 is an overview depicting an implementation of a system for providing information via a computer network.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Implementations of specific applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to display the content item with the requested webpage on a display of the client device. In some instances, the content item is selected and served with a resource associated with a search query response. For instance, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to display the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For instance, a third-party content provider may place a bid in the auction that corresponds to an agreement to pay a certain amount of money if a user of a client device interacts with the provider's content item (e.g., the provider agrees to pay $3 if a user of a client device clicks on the provider's content item). In other implementations, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For instance, users of a client devices may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for instance, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL (e.g., /page/contentitem?devid=abc123&devnfo=A34r0). The content item request URL may include one or more parameters. Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score, may be generated to be used in the auction based on the bid value and the probability or another modifying value. In the prior implementation, the value or score for a bid based on whether the third-party content item is selected and served may be $0.005*1.00=0.005 and the value or score for a bid based on whether a user performs a specific action may be $5*0.002=0.01. In some implementations, the content item selection system may select the third-party content item with the highest value from the auction. In the foregoing implementation, the content item selection system may select the content item associated with the bid based on whether the user performs the specific action.

Once a third-party content item is selected by the content item selection system, data to display the third-party content item on a display of the client device may be transmitted to the client device using a network.

After a content item, such as an advertisement, is served to be presented with a resource to a user of a client device, the content item may have an effect on the user of a client device viewing the content item—an impression effect. In some implementations, a content item may be served several times before a maximum impression effect is achieved, such as 10 to 20 times. Such an accumulation period may be indicative of increasing interest of a user of a client device in the content item. That is, the accumulation period may be indicative of a need to show the same content item to the same user of a client device several times to increase the initial impression effect during the accumulation period. The accumulation period may be over a few hours or days, in some implementations.

After a maximum impression effect is reached, as time elapses, the effect of subsequent impressions may fade as the user of a client device may forget about the content item or may be less interested in the content item during a decay period. The decrease of impression effectiveness during the decay period after the accumulated impression effect reaches a maximum may occur several days after the initial impression and may vary for each content item and each user.

As time elapses further, a user's interest in the content item may re-enter the accumulation period after a demand rebuilding period. The demand rebuilding period may occur several weeks or months after the decay period and may depend on the consumption cycle time of the content item or a product of the content item, in some implementations.

The accumulation, decay, and demand rebuilding periods for a content item for a client device over a relatively long period of time may be represented by a content item impression effect curve or distribution. In some implementations, the content item impression effect may be a long-term content impression effect or demand distribution over time from a client device's content item engagement perspective (i.e., impression effect over a client device time axis for a content item), based on various signals, such as content item properties, first-party resource properties, first-party content provider properties, aggregate client device properties or aggregate user behaviors, etc. It may be useful to determine and/or model the content item impression effect of a content item. Such modeling of the content item impression effect may be used by the content item selection system during the determination of whether to select a content item. In some implementations, the modeling of the content item impression effect may be over an extended period of time, such as the distribution of an impression effect over one week, two weeks, four weeks, one month, two months, etc. In some implementations, the modeling may be achieved through the use of a classification model and/or a predictive model that outputs one or more values in response to receiving one or more impression effect input parameters. The classification model may output a value indicative of a determined period (e.g., 1 for the decay period, 0 for the accumulation period, etc.). A predictive model may output several values such that a graph, data table, or other data aggregation object may be generated for the predicted impression effect. In another implementation, the predictive model may output several values such that a graph, data table, or other data aggregation object may be generated for the predicted accumulation or decay of the impression effect.

The impression effect for a content item impression effect curve or distribution may be dependent on the client device, the content item, the third-party content provider, a resource with which the content item is presented, etc. For instance, each content item may have a different effect on a user's interest, an aggregate user demand cycle time, etc. Thus, the impression effect may vary for different content items. Similarly, different aggregate user profiles may be associated with different interests, different behavior patterns, etc., and may react to repetitive impressions distinctively. Accordingly, one or more of the inputs for the classification models and/or predictive models described herein may include parameters associated with an aggregate profile, parameters associated with a client device, parameters associated with a publisher or resource, parameters associated with a content item or campaign, and/or parameters associated with a third-party content provider.

In some implementations, the content item impression effect distribution may be used to determine whether the client device is in the accumulation period, the decay period, or the demand rebuilding period for a content item based on the time. In some implementations, the time may be a period of time relative to a first impression of the content item (e.g., a number of hours, a number of days, a number of weeks, etc.), a number of impressions (e.g., the content item has been shown five times), or a combination of a period of time and number of impressions. Such a determination of the period may use a classification model.

In some implementations, the determined period by the classification model may be used to select a predictive model, such as an impression effect decay predictive model, an impression effect accumulation predictive model, etc. The predictive model may output a value corresponding to the current predicted impression effect value. The predicted impression effect value, for instance a boost or decay factor, may then be used in determining another value, such as a score, by the content item selection system. That is, a predicted impression effect value for a given client device, a given content item, and a given resource and/or publisher may be used during the selection of a content item in response to a content item request. For instance, an outputted predicted impression effect value from a predictive model may be used as a boost or a decay factor when determining the score. In still other implementations, the value outputted by the predictive model may be incorporated as part of another predictive model for other predicted values, such as a pCTR predictive model or a pCVR predictive model, such that the predictive model may take into account the predicted impression effect value in calculating the value, such as pCTR or pCVR.

In some implementations the impression effect and decay thereof during the decay period may be used to reduce the likelihood that the content item is selected and served by the content item selection system. Initially, it may be less useful to show the content item immediately after serving the content item after the maximum impression effect has been achieved. As time elapses and the decay of the impression effect continues, it may be more useful to show the same content item to the same client device. Accordingly, the likelihood of the content item being selected and served by the content item selection system may be increased based on the decaying impression effect in some implementations.

In some implementations the accumulation of impression effect may be used to increase the likelihood that the content item is selected and served by the content item selection system during the accumulation period, such as through a boost factor. As time elapses and the accumulation of the impression effect increases, it may be less useful to boost the likelihood of the content item being selected and shown to the same client device. Accordingly, the boost factor may be decreased based on the increasing impression effect in some implementations.

In some implementations, the impression effect may be logged as a count of the times a content item is selected and served to a client device within a given period, such as daily, weekly, monthly, etc. In some implementations, once the count exceeds a predetermined level, such as a frequency cap, the content item may be excluded from future selection by the content item selection system.

Such content item impression effect curve or distribution may be used to avoid showing the same or similar sets of content items to the same client device day after day, regardless of a lack of interest or engagement with the content items, to increase the broadness or variety of selected content items, etc.

While the foregoing has provided an overview of modeling content item impression effect, including the accumulation, decay, and rebuilding of demand for a content item impression, and implementations utilizing such modeling, more specific implementations and systems to implement such a system will now be described.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for instance with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®. The processing module may process instructions and provide data to display one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to display one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate interaction with the first-party content.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to display a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for instance, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user (represented by a device identifier), which, when accessing a resource of the resource server 104, can make a request to the content item selection system 108 for content items to be presented with the resource, for instance.

The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie which contains a device identifier (e.g., a random number) that represents the client device 110. In some implementations, the device and/or the resource information or parameters may be appended to a content item request URL (e.g., /page/contentitem?devid=abc123&devnfo=A34r0). In some implementations, the device and/or the resource information or parameters may be encoded prior to being appended to the content item request URL. The requesting device and/or the resource information or parameters may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For instance, the third-party content provider may set bid values and/or selection criteria via a user interface that may include one or more content item conditions or constraints regarding the serving of content items. A third-party content provider may specify that a content item and/or a set of content items should be selected and served for client devices 110 having device identifiers associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

While the foregoing has provided an overview of a system 100 for selecting and serving content items to client devices 110, implementations of content items served with resources will now be described in reference to FIGS. 2-3. FIG. 2 depicts an implementation of a display 200 (shown in phantom) of a client device, such as client device 110 of FIG. 1, with a web browser 210 for displaying resources on the display 200. The web browser 210 may operate by receiving input of a URL in an address bar, such as a web address, from an input device (e.g., a pointing device, a keyboard, a touch screen, or another form of input device). In response, one or more processors of a client device executing the instructions from the web browser 210 may request data from another device connected to a network, such as network 106, referred to by the URL address (e.g., a resource server 104). The other device may then provide data to display the resource to the client device, which causes visual indicia to be displayed by the display 200 of the client device. Accordingly, the web browser 210 displays a retrieved resource 220, such as a webpage.

A resource 220 is shown displayed by the display 200 of the client device using the web browser 210. The resource 220 includes a first-party content portion 222, a first content item slot 224, and a second content item slot 226. The first-party content portion 222 includes the first-party content of the first-party content provider, such as a news article, a social network interface, an application, etc. In the implementation shown in FIG. 2, a first third-party content item may be selected and served in the first content item slot 224 and a second third-party content item may be selected and served in the second content item slot 226, such as using content item selection system 108 of FIG. 1.

In some implementations, the first-party content of the resource 220 may impact the impression effect for a content item presented with the resource 220. For instance, if the first-party content of the resource 220 is an application, such as a web game, then the presentation of a third-party content item in the first content item slot 224 and/or the second content item slot 226 may result in less of an impression effect and/or a more rapid impression effect decay. In another implementation, if the first-party content of the resource 220 is news article, then the presentation of a third-party content item in the first content item slot 224 and/or the second content item slot 226 may result in a greater impression effect and/or a slower impression effect decay. Such first-party content characterizations may be categorized (e.g., news-related resource content, application-related resource content, etc.) and represented by a corresponding value for a parameter (e.g., a value of 1 for a parameter ResConType corresponds to a news-related resource content, 2 for application-related resource content, etc.).

According to various implementations, data for the content of the resource 220 may be sent to the content item selection system 108 of FIG. 1. The content of the resource 220 may be parsed for keyword terms to determine the category of the content of the resource 220. For instance, the content item selection system 108 may receive or extract keyword terms and determine a category for the resource 220 based on the keyword terms. In general, a category may be a set of words that convey the same or similar ideas. A word category may be a set of synonyms, according to one implementation. For instance, the text of the resource 220 may include the word "hotel." A word category that includes the word "hotel" may be as follows: category_1={inn, hotel, hostel, lodge, motel, public house, spa}

Such a category may be used to identify resources 220 devoted to the same topic, but use different terminology to do so.

In various implementations, the category of the content of the resource 220 may be determined based on the parsed keyword terms. For instance, a resource 220 containing keyword terms for news may indicate a news article. In other implementations, the category of the content of the resource 220 may be determined based on a structure of the resource 220. For instance, the resource 220 having a first-party content portion 222 having a long vertical textual portion may correspond to an article category for the content of the resource 220. In other instances, a first-party content portion 222 having several images may indicate and photo album category for the content of the resource 220. In still other instances, a first-party content portion 222 having a multimedia module may correspond to an application category for the content of the resource 220.

In another implementation, the publisher of content of the resource 220 may impact the impression effect for a content item presented with the resource 220. For instance, if the publisher of the first-party content displayed in the first-party content portion 222 is a first entity, such as a well-known news publisher having readers that are more likely to be engaged with a third-party content item served with the first-party content, then the presentation of a third-party content item in the first content item slot 224 and/or the second content item slot 226 may result in a greater impression effect and/or a slower impression effect decay. In another implementation, if the publisher of the first-party content displayed in the first-party content portion 222 is a second entity, such as a social link aggregation publisher having readers that are less likely to be engaged with a third-party content item served with the first-party content, then the presentation of a third-party content item in the first content item slot 224 and/or the second content item slot 226 may result in less of an impression effect and/or a more rapid impression effect decay. Of course other parameters associated with the resource 220 and/or the publisher of the resource 220 may be used.

FIG. 3 depicts a mobile client device 300, such as a smartphone or tablet, on which a resource 310 may be displayed by a display 302 of the client device 300. In the implementation depicted in FIG. 3, the resource 310 is a mobile application executing on the client device 300. In some implementations, the mobile application resource 310 may execute code to display first-party content 312 (e.g., a mobile game application), on the display 302 of the client device 300. In some implementations, the resource 310 may also include code to request one or more third-party content items 314 to be presented with the first-party content 312. In response, one or more processors of the client device 300 executing the instructions may request data from another device (e.g., a content item selection system 108) connected to a network, such as network 106. The other device may then provide data to display the third-party content item 314 to the client device 300, which causes visual indicia to be displayed by the display 302 of the client device 300.

In some implementations, the first-party content 312 may impact the impression effect decay for a content item 314 presented with the first-party content 312. In the implementation shown in FIG. 3, if the resource 310 includes first-party content 312 for a mobile game application, then the presentation of the third-party content item 314 may result in less of an impression effect and/or a more rapid impression effect decay. In another implementation, if the resource 310 includes first-party content 312 for a news application, then the presentation of the third-party content item 314 may result in a greater impression effect and/or a slower impression effect decay.

In another implementation, the publisher of the resource 310 may impact the impression effect for a content item 314 presented with the first-party content 310. For instance, if the publisher of the resource 310 is a first entity, such as a mobile game application producer having application users that are more likely to be engaged with a third-party content item 314 served with the first-party content 312, then the presentation of a third-party content item 314 may result in a greater impression effect and/or a slower impression effect decay. In another implementation, if the publisher of the resource 310 is a second entity, such as a news aggregation application publisher having readers that are less likely to be engaged with a third-party content item 314 served with the first-party content 312, then the presentation of a third-party content item 314 may result in less of an impression effect and/or a more rapid impression effect decay. Of course other parameters associated with the resource 310 and/or the publisher of the resource 310 may be used.

FIGS. 4-5 depict graphical diagrams depicting content item impression effect curves or distributions 400, 500 over a time period. In the implementation shown in FIG. 4, the content item impression effect distribution 400 has an accumulation period 410, a decay period 420, and a demand rebuilding period 430. During the accumulation period 410, the impression effect increases slowly during a first portion, relatively rapidly during a second portion, then slowly reaches a maximum impression effect value during a third portion. The probability that a user of a client device will engage with the content item (e.g., select the content item or otherwise interact with the content item) during the accumulation period 410 increases from a low impression effect to an impression effect maximum. When in the accumulation period 410, demand for an impression of the content item may be high, even though the impression effect or probability that a user of a client device will engage with the content item is low.

The impression effect begins to decay during the decay period 420 until the impression effect is at a minimum. The impression effect slowly decays during a first portion of the decay period 420, then rapidly decays during a second portion, followed by a slower decay during a third portion until the impression effect is at a minimum, which may be substantially zero. The decay period 420 is a period where the probability of user engagement with the content item decreases from the maximum impression effect to a minimum due to user engagement with the content item (e.g., click, view, comments, etc.) that has occurred or decreases due to a user of a client device not being interested in the content item.

The impression effect remains at a minimum during the demand rebuilding period 430 until a new accumulation period occurs. Such content item impression effect distribution 400 may, for instance, correspond to the impression effect of a first content item presented to a client device having a first aggregate profile and with a news article resource 220 of FIG. 2 or a news aggregation application resource 310 of FIG. 3.

In the implementation shown in FIG. 5, the content item impression effect curve or distribution 500 has an accumulation period 510, a decay period 520, and a demand rebuilding period 530. During the accumulation period 510, the impression effect increases slowly during a first portion, moderately during a second portion, then slowly reaches a maximum impression effect value during a third portion. The impression effect begins to decay during the decay period 520 until the impression effect is at a minimum. The impression effect rapidly decays during a first portion of the decay period 520, then slowly decays during a second portion until the impression effect is at a minimum, which may be substantially zero. The impression effect remains at a minimum during the demand rebuilding period 530 until a new accumulation period occurs. Such a content item impression effect distribution 500 may, for instance, correspond to the impression effect of the same first content item presented to the same client device having the same first aggregate profile and with a web game application resource 220 of FIG. 2 or a mobile game application resource 310 of FIG. 3. Other content item impression effect distributions may be determined or generated based on other parameters described herein.

The different periods and impression effect values of a content item impression effect distribution may be useful in determining whether to select and serve various content items. For instance, if a relevant content item has been recently shown to a user of a client device and the content item impression effect distribution for the content item is in the first portion of the decay period, then it may be useful to use such data by the content item selection system 108 of FIG. 1 to select and serve a slightly less relevant content item has not been recently shown that is in the accumulation period of the content item impression effect distribution instead of re-serving the recently served content item.

Figure 6:
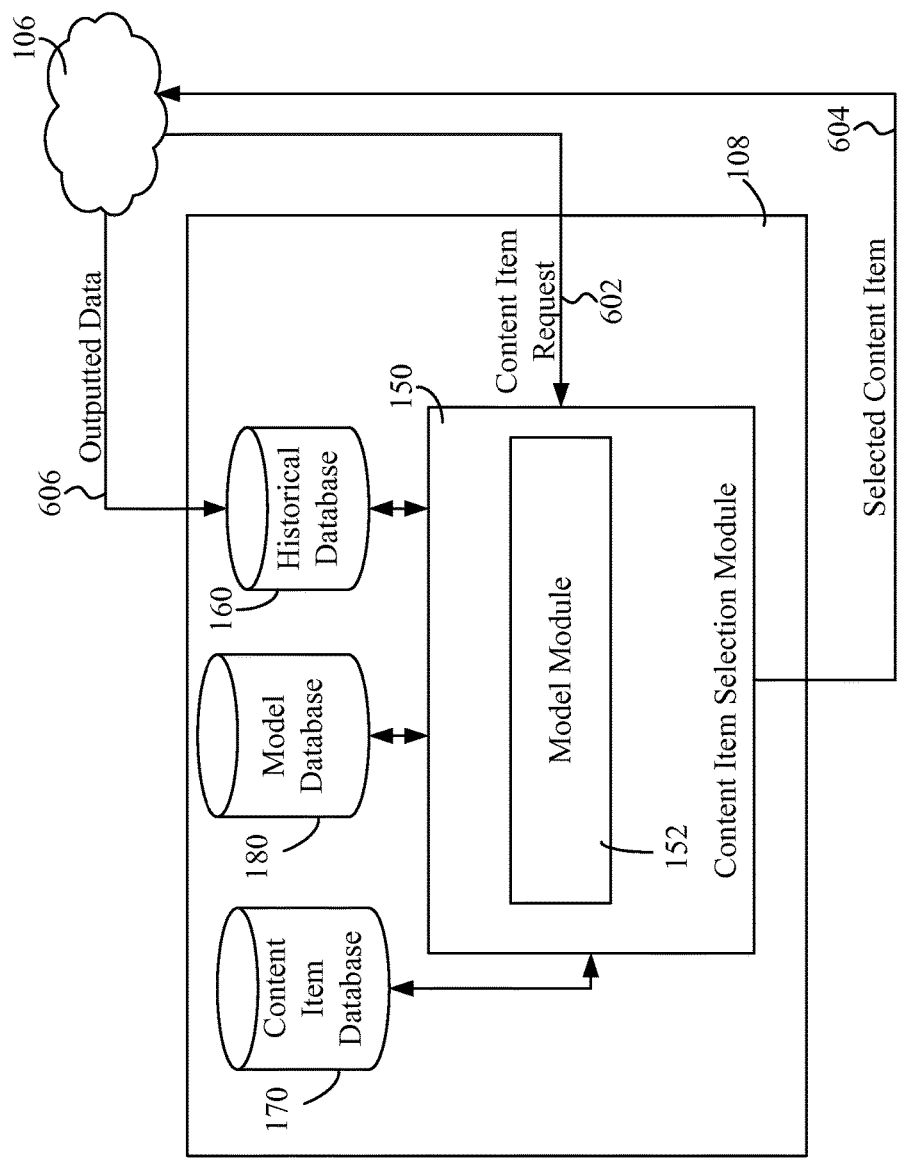
FIG. 6 is a block diagram of an implementation of a system for selecting content items.

FIG. 6 is a block diagram of an implementation of a portion of the content item selection system 108 of FIG. 1 that utilizes the content item impression effect distribution in the selection and serving of content items. The content item selection system 108 includes a content item selection module 150 and one or more databases, such as a historical database 160, a content item database 170, and/or a model database 180.

The content item selection module 150 is configured to receive a content item request 602 via the network 106. A client device, such as client device 110 of FIG. 1, or a resource server, such as resource server 104, may send the content item request 602 to the content item selection system 108 via the network 106. The content item request 602 may include one or more current impression effect parameters representative of characteristics of the client device (e.g., a unique identifier associated with the client device, a type of client device, a display type of a client device, dimensions of the display, etc.), a current client device context, a client device intention (e.g., an interest in purchasing a product, an intention to view more information on a topic, etc.), an aggregate profile (e.g., an aggregate profile of several client devices associated with the current client device), and/or characteristics of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). In some implementations, the foregoing current impression effect parameters may be appended to or included in a content item request URL (e.g., /page/contentitem?devid=abc123&devnfo=A34r0).

Responsive to the content item request 602, the content item selection module 150 is configured to select and serve a content item 604. In some implementations, the content item selection module 150 is configured to perform an auction. That is, the content item selection module 150 may generate one or more values, such as scores, for one or more content items based, at least in part, on the content item request 602, and select one or more content items to be served. In some instances, the content item selection module 150 ranks the values (e.g., highest to lowest) and selects the content item associated with a value based on the ranking (e.g., selecting the content item associated with the highest ranked value or score). As will be described in greater detail herein, a classification model and/or a predictive model may be used by a model module 152 of the content item selection module 150. A classification model may initially be utilized to determine a period of the content item impression effect curve or distribution for a content item for the content item request. In some implementations, a predictive model may be selected based on the determined period of the content item impression effect curve or distribution. The predictive model may output a value that modifies or is used to generate the value or score by the content item selection module 150.

Data to display the selected content item 604 may be transmitted or served by the content item selection module 150 to the client device and/or the resource server via the network 106. The data can include graphical data, textual data, image data, audio data, video data, etc. that may be accessed from a database, such as the content item database 170 described herein.

The databases 160, 170, 180 shown in FIG. 6 may store data for and/or provide data to the content item selection module 150. The databases 160, 170, 180 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. While the implementation shown in FIG. 6 depicts the databases 160, 170, 180 as separate databases, it should be understood that the databases 160, 170, 180 may be combined into a single database or sets of databases.

The data stored in the historical database 160 may include data for one or more prior impression effect parameters. The prior impression effect parameters may be associated with a client device, an aggregate user profile, a content item, a third-party content provider, a resource, and/or a publisher. In some implementations, the prior impression effect parameters may be associated with a historical engagement of one or more client devices with one or more content items. That is, the historical database 160 may store in a data structure, such as a data table, one or more prior impression effect parameters about the context of a prior selection, serving, and/or interaction of one or more client devices with one or more content items.

Such prior impression effect parameters may include whether a client device performed a conversion action, such as clicking on one or more content items, purchasing a product associated with the one or more content items, registering for a service associated with the one or more content items, signing up for an e-mail list associated with the one or more content items, etc.

In addition, the prior impression effect parameters may include prior device information (e.g., one or more other previous resource requests from the client device, one or more previous other content items received by the client device, previous contextual data for the client device, previous intention data for the client device, one or more previous interests for the client device, an aggregate profile, etc.) and prior resource information (e.g., prior URLs of requested resources, one or more keywords of the content of the prior requested resources, text of the content of the prior resources, a title of the prior resources, a category of the prior resources, a type of the prior resources, a property of the prior resources, an interactivity level of the prior resources, a ranking of the prior resources, a popularity of the prior resources, a category of a publisher associated with the prior resources, a type of a publisher associated with the prior resources, a property of a publisher associated with the prior resources, etc.).

The prior impression effect parameters may also include prior content item parameters, such as a property of the prior content item, an interactivity of the prior content item, a popularity of the priority content item, a category of the prior content item, one or more keywords associated with the prior content item, a format of the prior content item, a group associated with the prior content item, a campaign associated with the prior content item, etc.

The prior impression effect parameters may still further include temporal parameters associated with the one or more client devices and the one or more content items, such as a prior time of a day associated with when the one or more client devices were served the one or more content items (e.g., an exact time of the day, an hour of the day, a categorical period, such as morning, of the day, etc.), a prior day of a week associated with when the one or more client devices were served the one or more content items (e.g., a Monday, a Tuesday, etc.), a prior day of a month associated with when the one or more client devices were served the one or more content items, a prior day of a year associated with when the one or more client devices were served the one or more content items, a time differential between when the one or more client devices were served a content item and a conversion action performed by the client device associated with the content item (e.g., five days between when a content item is served and a conversion action), a number of impressions of one or more content items before a conversion action performed by the client device associated with the content item (e.g., a content item was shown three times before a conversion action), a number of impressions of one or more content items associated with a client device within a prior predetermined period of time (e.g., a number of impressions of a content item for the past 30 days, 60 days, 90 days, etc.), etc.

In some implementations, the prior impression effect parameters received with the content item request 602 may be stored in the historical database 160. If a conversion action is performed in response to the selected and served content item 604, the client device may transmit data 606 indicative of such a conversion action. In some instances, the transmitted data 606 may include a unique identifier such that the data indicative of the conversion action may be associated with the stored parameters received with the content item request 602. Thus, the parameters of the content item request 602 may be used as prior impression effect parameters to generate and/or update a content item impression effect curve or distribution based on a model, a classification model, and/or a predictive model.

The data stored in the content item database 170 may include data to display one or more content items. The data can include graphical data, textual data, image data, audio data, video data, etc. The data stored in the content item database 170 may include unique identifiers associated with the data such that the content item selection module 150 can access the corresponding data based on the unique identifier.

In some implementations, the model database 180 may store data for one or more generated content item impression effect curves or distributions, classification models, and/or predictive models. For instance, in some implementations a content item impression effect curve or distribution may be generated for each content item and stored in the model database 180. In other implementations, a content item impression effect curve or distribution may be generated for each client device and stored in the model database 180. In further implementations, a content item impression effect curve or distribution may be generated for each third-party content provider and/or for each campaign of the third-party content provider and stored in the model database 180.

In some implementations, a classification model may be generated for each content item, each client device, each third-party content provider, and/or each campaign of the third-party content provider. In still other implementations, a predictive model may be generated for each content item, each client device, each third-party content provider, and/or each campaign of the third-party content provider. In some implementations, a predictive model may be generated for the accumulation period, for the decay period, and/or for the demand rebuilding period.

In yet other implementations, other models may incorporate the content item impression effect curves or distributions, the classification models, and/or the predictive models, such as a predictive model for pCTR, a predictive model for pCVR, etc. The models described herein may each be associated with a unique identifier such that the content item selection module 150 can access the corresponding model based on the unique identifier.

The content item selection module 150 includes a model module 152. In some implementations, the model module 152 is configured to access data stored in the historical database, such as the one or more prior impression effect parameters discussed herein, and to generate and/or update one or more of the content item impression effect curves or distributions, classification models, and/or predictive models described herein. As noted above, the generated and/or updated content item impression effect curves or distributions, classification models, and/or predictive models may be stored in the model database 180. In some implementations, the model module 152 may generate and/or update the content item impression effect curves or distributions, classification models, and/or predictive models using a machine learning algorithm, such as a regression learning algorithm. Implementations of such regression learning algorithms include perceptron linear learning, maximum entropy logistic regression, support vector machine (SVM) regression with maximum entropy gradient, descent least-squares stochastic gradient, etc.

The model module 152 is also configured to access the one or more current impression effect parameters from a data structure, such as the content item request 602. In some implementations, the content item selection module 150 receives the content item request 602 and may parse one or more current impression effect parameters included with the content item request 602. If the one or more current impression effect parameters are encoded for the content item request 602, the content item selection module 150 may decode the encoded current impression effect parameters. The model module 152 accesses the parsed one or more current impression effect parameters.

The model module 152 may also access one or more current impression effect parameters associated with a content item and/or third-party content provider. For instance, each content item that is included in an auction performed by the content item selection module 150 may have one or more parameters that may affect the impression effect and/or the decay thereof. For instance, such parameters may include a category of the content item, one or more keywords associated with the content item, a format of the content item, a group of the content item, a campaign of the content item, an interactivity level of the content item, a popularity of the content item, a category of a third-party content provider associated with the content item, a type of a third-party content provider associated with the content item, a property of a third-party content provider associated with the content item, etc.

In some implementations, the model module 152 may also access a content item impression effect curve or distribution, classification model, and/or predictive model from the model database 180 with which to use the accessed one or more current impression effect parameters. In some implementations, a classification model may initially be used to determine a period of a content item impression effect curve or distribution for a content item based on the one or more parameters. In some implementations, responsive to the determined period, such as a decay period, a predictive model may be accessed to be used with the one or more parameters to generate a decay value for each content item to be in the auction performed by the content item selection module 150. In other implementations, such as an accumulation period, a predictive model may be accessed to be used with the one or more parameters to generate an accumulation value for each content item to be in the auction performed by the content item selection module 150. In still further implementations, no predictive model may be used (e.g., during an accumulation period, no modification of the value or score generated by the content item selection module 150 may be performed, according to some implementations).

In some implementations, the content item impression effect curve or distribution, classification model, and/or predictive model may be accessed from the model database 180 corresponding to a content item, a third-party content provider, a campaign, a resource, a publisher, or a client device (for instance, a content item impression effect curve or distribution, classification model, and/or predictive model may be associated with a client device such that the same content item impression effect curve or distribution, classification model, and/or predictive model may be used for each content item request 602 from that client device).

The model module 152 may, in some implementations, output a value using a predictive model, such as an impression effect decay predictive model or an impression effect accumulation predictive model, and based on the one or more parameter inputs.

In some implementations, the outputted value of a classification model may be a value corresponding to a period of the content item impression effect curve or distribution, such as a 0 for an accumulation period, a 1 for a decay period, and/or a 2 for the demand rebuilding period. The value outputted by the classification model may be used to select a predictive model based on the determined period or if no predictive model is to be used, in some implementations.

In some implementations, the outputted value may be a decay factor. The decay factor may have a numerical value between 0, inclusive, and 1, inclusive, such as 0.647, that may be used to modify a value generated by the content item selection module 150. In some instances, the decay factor may be a discount factor that may be multiplied by the value generated by the content item selection module 150. For instance, a decay factor of 0, which may correspond to when a content item has just been shown during the decay period, may result in the value generated by the content item selection module 150 to also be 0. Thus, a content item that has just been selected and served to a client device during the decay period of a content item impression effect curve or distribution is unlikely to be shown based on the substantial reduction of the value by the decay factor. In another implementation, a decay factor of 0.7, which may correspond to a content item being shown a few hours, days, etc. ago during the decay period, may result in the value generated by the content item selection module 150 to be reduced, but may still be selected. A decay factor of 1, which may correspond to a content item being shown a few weeks ago, such as at the end of the decay period or during the demand rebuilding period of the content item impression effect curve or distribution, may not modify the value generated by the content item selection module 150. That is, the decay factor indicates the content item has been shown a substantially long time ago and will not lessen the likelihood of the content item being selected and served to the client device. In some implementations the value generated by the content item selection module 150 may be divided by an inverse of the decay factor to increase the value generated by the content item selection module 150, thereby promoting content items that have not been shown for a long period of time. In still other implementations, the value output by the predictive model may be added or subtracted from the value generated by the content item selection module 150.

In some implementations, the outputted value may be a boost factor. The boost factor may have a numerical value between 0 and 1, inclusive, such as 0.647, that may be used to modify a value generated by the content item selection module 150. In some instances, the inverse of the boost factor may be multiplied by the value generated by the content item selection module 150. For instance, a boost factor of 0.05, which may correspond to when a content item is initially shown during the accumulation period of the content item impression effect curve or distribution, may result in the value generated by the content item selection module 150 be increased by a factor of 20. Thus, a content item that has just been selected and served to a client device during an accumulation period may have the likelihood of being displayed substantially increased based on the substantial increase of the value by the boost factor. In another implementation, a boost factor of 0.7, which may correspond to a content item being shown a few hours, days, etc. ago during the accumulation period, may result in the value generated by the content item selection module 150 to be increased, but by a reduced amount. A boost factor of 1, which may correspond to the end of the accumulation period when the impression effect is at a maximum, may not modify the value generated by the content item selection module 150. That is, the boost factor will not increase the likelihood of the content item being selected and served to the client device. In still other implementations, the value output by the predictive model may be added or subtracted from the value generated by the content item selection module 150.

In some other implementations, the outputted value may be another predicted value, such as a value for pCTR or pCVR representative of a probability that the content item will be clicked on or that a conversion will occur, respectively. Such predictive models may integrate the content item impression effect curve or distribution, classification model, and/or predictive model into the predictive model for the predicted value (e.g., integrated into a pCTR predictive model or a pCVR predictive model).

Figure 7:
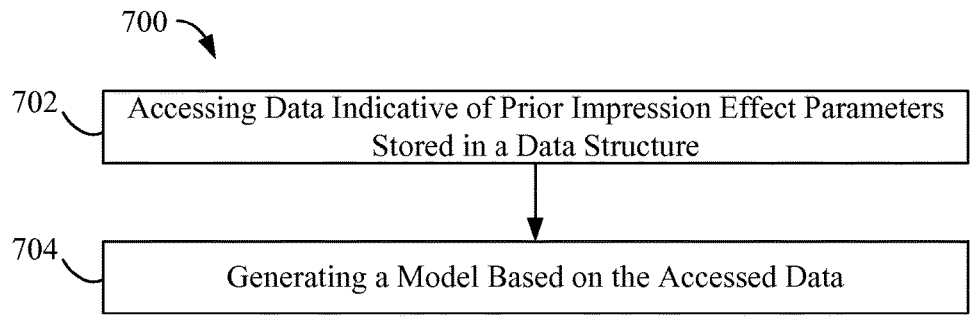
FIG. 7 is a flow diagram of an implementation of a process for training a model.

FIGS. 7-10 depict processes 700, 800, 900, 1000 that may be implemented by the content item selection system 108 to select and serve content items utilizing models that factor in the impression effect. FIG. 7 depicts an implementation of a process 700 that may be used by the model module 152 for generating a content item impression effect curve or distribution, a classification model, and/or a predictive model based on prior impression effect parameters. The process 700 includes accessing data indicative of prior impression effect parameters stored in a data structure (block 702). The prior impression effect parameters may be accessed by the model module 152 of the content item selection system 108 from a data structure, such as a data table, stored in a database, such as the historical database 160. The prior impression effect parameters include known input parameters that are associated with known output values. Implementations of such known output values may include whether a content item was clicked on, whether a conversion action occurred, etc.

The prior impression effect input parameters may include, for instance, a number of impressions for one or more content items associated with the known output value within a prior predetermined period of time, one or more temporal parameters associated the one or more content items associated with the known output value, one or more content item parameters associated with the one or more content items associated with the known output value, one or more prior third-party content provider parameters associated with the one or more content items associated with the known output value, one or more prior device parameters associated with the one or more content items associated with the known output value, one or more prior resource parameters associated with the one or more content items associated with the known output value, etc.

The one or more temporal parameters may include a time of a day associated with when a client device was served one or more content items, a day of a week associated with when a client device was served one or more content items, a day of a month associated with when a client device was served one or more content items, a day of a year associated with when a client device was served one or more content items, a time differential between when a client device was served a content item and a conversion action performed by the client device, a number of impressions of one or more content items before a conversion action was performed by a client device, a number of impressions of one or more content items for a client device within a prior predetermined period of time, etc.

The one or more content item parameters may include a content item property (e.g., a content item category or vertical, a content item keyword, a content item format, an aggregate engagement history for the content item, an interactivity of the content item, a popularity of the content item, a group associated with the content item, a campaign associated with the content item, etc.).

The one or more prior third-party content provider parameters may include a third-party content provider property and/or third-party content provider identification (e.g., a third-party content provider type, a third-party content provider category, etc.).

The one or more client device parameters may include long-term client device profile and/or prior client device activity or intention (e.g., long-term client device interests, client device characteristics, an client device engagement history for content items, a client device intention, an aggregate user profile or behavior, etc.).

The one or more prior resource parameters may include a resource property and/or a first-party content provider property (e.g., URLs of requested resources, one or more keywords of the content of the requested resources, text of the content of the resources, a title of the resources, a category of the resources, a resource type (i.e., website, mobile application, desktop application, game, etc.), an interactivity level of the resources, a ranking of the resources, a popularity of the resources, a resource visual property (i.e., page or application visual component layout, etc.), a category of a publisher associated with the resources, a publisher type (i.e., type of website publisher, type of mobile application publisher, type of desktop application publisher, type of game publisher, etc.), a publisher visual property, query contextual keywords, verticals, or categories, etc.).

A content item impression effect curve or distribution, a classification model, and/or a predictive model is generated based on the accessed prior impression effect parameters and the known output values (block 704). The model module 152 may generate the content item impression effect curve or distribution, classification model, and/or predictive model using a machine learning algorithm, such as a regression learning algorithm. Implementations of such regression learning algorithms include perceptron linear learning, maximum entropy logistic regression, support vector machine (SVM) regression with maximum entropy gradient, descent least-squares stochastic gradient, etc. In some implementations, a content item impression effect curve or distribution, a classification model, and/or a predictive model may be generated for each content item, third-party content provider, campaign, resource, publisher, and/or client device.

In some implementations, the prior impression effect parameters may be used to initially generate a content item impression effect curve or distribution for a content item for a client device. Using the content item impression effect curve or distribution for a content item for a client device, the model module 152 may generate a classification model to determine a period (i.e., accumulation period, decay period, or demand rebuilding period) based on the prior impression effect parameters. In addition, the model module 152 may also generate one or more predictive models for one or more of the periods. For example, the model module 152 may generate a content item impression effect decay predictive model for the decay period, a content item impression effect accumulation predictive model for the accumulation period, and/or a content item demand rebuild predictive model for the demand rebuilding period. The predictive models for each period may be based on the prior impression effect parameters associated with the correspond period and/or based on content item impression effect curve or distribution.

The model or models generated by the model module 152 may be configured to model the impression effect, the accumulation of impression effect, an impression effect decay, and/or a rebuilding of demand over a predetermined period of time. In some implementations, the period of time may be used to limit the prior impression effect parameters used by the model module 152 in generating the content item impression effect curve or distribution, classification model, and/or predictive model. That is, the period of time for which the model is to be configured for may be used as a date span for the impression effect parameters, thereby potentially reducing the input parameters needed. For instance, if the model is to be configured to model the impression effect over a period of four weeks, then only the impression effect parameters associated with a known output value for a content item that occurred within four weeks of the initial impression of the content item are used by the model module 152 in generating the content item impression effect curve or distribution, classification model, and/or predictive model. Impression effect parameters associated with a known output value for a content item that occurred more than four weeks from the initial impression of the content item may be omitted. In other implementations, all impression effect parameters associated with a known output value for a content item may be used to generate the model.

In some implementations, the generated content item impression effect curve or distribution, classification model, and/or predictive model may be stored in a database, such as the model database 180, such that the content item impression effect curve or distribution, classification model, and/or predictive model may be used by the model module 152 in response to another content item request. In some implementations, each content item impression effect curve or distribution, classification model, and/or predictive model may include a unique identifier. In some implementations, the process 700 may receive additional prior impression effect input parameters (block 702) and may update the content item impression effect curve or distribution, classification model, and/or predictive model or regenerate the content item impression effect curve or distribution, classification model, and/or predictive model (block 704) based on the additional prior impression effect input parameters and known additional output values.

Figure 8:
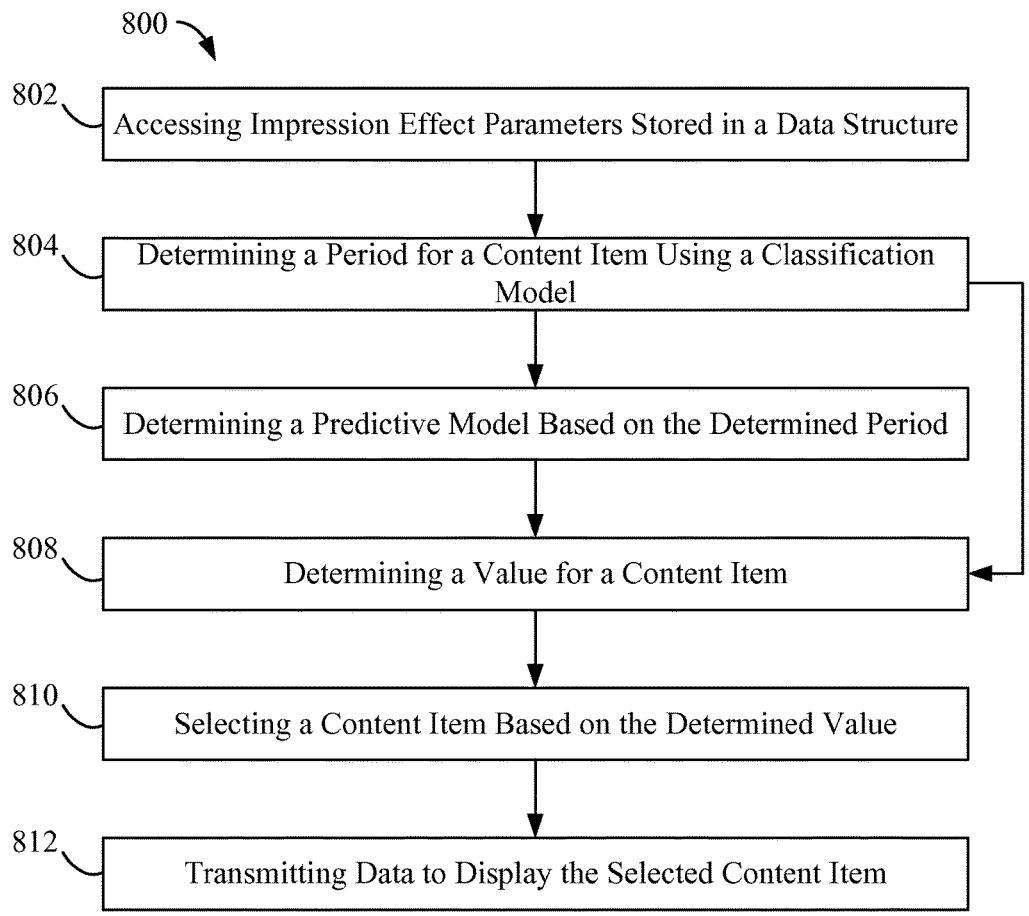
FIG. 8 is a flow diagram of an implementation of a process for selecting and serving a content item.

FIG. 8 depicts an implementation of a process 800 for selecting and serving a content item using a classification model and a predictive model. The process 800 includes accessing impression effect parameters stored in a data structure (block 802). The impression effect parameters may include current impression effect parameters as well as prior impression effect parameters. The current impression effect parameters may be accessed by the model module 152 from a data structure, such as a memory, once the current impression effect parameters are parsed from a content item request, such as content item request 602. The current impression effect parameters from the content item request 602 may include characteristics of the client device (e.g., a unique identifier associated with the client device, a type of client device, a display type of a client device, dimensions of the display), a current client device context, a client device intention, an aggregate profile (e.g., an aggregate profile of several client devices associated with the current client device), and/or characteristics of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.).

The current impression effect parameters may also be accessed from a data structure associated with a content item for which a value is to be outputted from the classification model and/or predictive model. For instance, each third-party content item may be associated with a data structure including content item parameters and third-party content provider parameters. Such parameters may include a category of the content item, one or more keywords associated with the content item, a format of the content item, a group of the content item, a campaign of the content item, an interactivity level of the content item, a popularity of the content item, a category of a third-party content provider associated with the content item, a type of a third-party content provider associated with the content item, a property of a third-party content provider associated with the content item, etc.

In some implementations, prior impression effect parameters may be accessed by the model module 152 of the content item selection system 108 from a data structure, such as a data table, stored in a database, such as the historical database 160. The prior impression effect parameters include those parameters associated with one or more client devices which have been served the content item and/or parameters associated with the client device client device which is to be served the content item responsive to the content item request. That is the prior impression effect parameters may be associated with a historical engagement of one or more client devices or the client to be served a content item with one or more content items.

The prior impression effect parameters may include parameters associated with prior client devices, prior content items, prior third-party content providers, prior resources, and/or prior publishers. Such prior impression effect parameters may include whether a client device performed a conversion action, prior client device parameters (e.g., one or more other previous resource requests from the client device, one or more previous content items received by the client device, previous contextual data for the client device, previous intention data for the client device, one or more previous interests for the client device, long-term client device interests, long-term client device characteristics, prior client device engagement history for content items, an aggregate profile, etc.), prior resource parameters (e.g., prior URLs of requested resources, one or more keywords of the content of the prior requested resources, text of the content of the prior resources, a title of the prior resources, a category of the prior resources, a type of the prior resources, a property of the prior resources, an interactivity level of the prior resources, a ranking of the prior resources, a popularity of the prior resources, a prior resource visual property, a category of a publisher associated with the prior resources, a type of a publisher associated with the prior resources, a property of a publisher associated with the prior resources, a publisher visual property, etc.), prior content item parameters (e.g., a property of the prior content item, an interactivity of the prior content item, a popularity of the priority content item, a category of the prior content item, one or more keywords associated with the prior content item, a format of the prior content item, a group associated with the prior content item, a campaign associated with the prior content item, etc.), and/or temporal parameters associated with the client device (e.g., a prior time of a day, a prior day of a week, a prior day of a month, a prior day of a year, a time differential between when the client device was served a content item and a conversion action performed by the client device, a number of impressions of one or more content items before a conversion action was performed by the client device, a number of impressions of one or more content items for the client device within a prior predetermined period of time, etc.).

Using the impression effect parameters and a classification model, the model module 152 determines a period of the content item impression effect curve or distribution for the client device for each content item (step 804). In some implementations, the model module 152 accesses a classification model from the model database 180 with which to use the accessed impression effect parameters. In some implementations, a single classification model may be accessed to be used with the parameters to determine a period for each content item in an auction performed by the content item selection module 150. That is, the model module 152 may use the single classification model with the accessed parameters of the content item request 602 and the parameters of each content item in the auction to output a corresponding period for each content item. In other implementations, a classification model may be accessed from the model database 180 corresponding to a content item, a third-party content provider, a campaign, a resource, a publisher, and/or a client device (i.e., a specific classification model for each content item, third-party content provider, campaign, etc. may be used). In the implementation of process 800 of FIG. 8, the determined period may be represented by a numerical value indicative of a predicted period for the content item (e.g., a 0 for the accumulation period, a 1 for the decay period, and/or a 2 for the demand rebuilding period) based on the impression effect parameters.

In some implementations, one or more of the periods may not have an associated predictive model, such as the accumulation period and/or the demand rebuilding period. If the determined period for the content item using the classification model (block 804) determines the period to be one which does not have a corresponding predictive model, then the process 800 may proceed directly to determining a value for the content item (block 808) without determining a predictive model (block 806). In such an instance, the determined value for the content item (block 808) may be the value determined by the content item selection system 108 without a decay factor or boost factor included.

If the determined period has a corresponding predictive model, then the model module 152 determines a predictive model based on the determined period (step 806). The determined predictive model may be a content item impression effect decay predictive model for the decay period, a content item impression effect accumulation predictive model for the accumulation period, and/or a content item demand rebuild predictive model for the demand rebuilding period.

A value for a content item may be determined (block 808). In some implementations, the value for the content item may be based, at least in part, on an output of the determined predictive model. For instance, in some implementations the model module 152 accesses an impression effect decay predictive model from the model database 180 with which to use the accessed impression effect parameters. The model module 152 uses the impression effect decay predictive model for a corresponding content item with the accessed parameters of the content item request 602 to output a corresponding decay factor value for the content item. The decay factor may be a numerical value indicative of a predicted decay of the impression effect of the content item based on the parameters. In some implementations, the decay value may be a numerical value between 0, inclusive, and 1, inclusive.

In other implementations, the model module 152 accesses an impression effect accumulation predictive model from the model database 180 with which to use the accessed impression effect parameters. The model module 152 uses the impression effect accumulation predictive model for a corresponding content item with the accessed parameters of the content item request 602 to output a corresponding boost factor value for the content item. The boost factor may be a numerical value indicative of a predicted impression effect relative to the maximum impression effect for the accumulation period based on the parameters. In some implementations, the boost factor may have a numerical value between 0 and 1, inclusive.

In some implementations, the content item selection module 150 determines the value using the decay factor or boost factor output from the model module 152, a bid associated with the content item for which the decay factor or boost factor was generated, and another predicted value, such as a pCTR value or pCVR value. That is, the content item selection module 150 may generate a score for the content item to be used in the auction based on the decay factor or boost factor, the bid value, and the predicted value or another modifying value. In some instances, the decay factor or boost factor may modify a score determined based on the bid and the predicted value by the content item selection module 150. In some implementations, the score may be calculated by:

$$\text{Score} = D_f * B * P$$

where $D_f$ is the decay factor, B is the bid value, and P is the predicted value, such as pCTR or pCVR. In other implementations, the decay factor may be divided, subtracted, or added to a score determined based on the bid and the predicted value by the content item selection module 150. In other implementations, the score may be calculated by:

$$\text{Score} = \frac{1}{B_f} * B * P$$

where $B_f$ is the boost factor, B is the bid value, and P is the predicted value, such as pCTR or pCVR. In other implementations, the boost factor may be divided, subtracted, or added to a score determined based on the bid and the predicted value by the content item selection module 150.

The content item is selected based on the determined value (block 810). The content item may be selected by the content item selection module 150 based on an auction where scores are determined for each content item in an auction. The content item selection module 150 may select the content item associated with the highest determined score after the decay factor and/or boost factor is factored in. In some implementations, each score is associated with a unique identifier for the associated content item. Based on the determined values or score, the content item selection module 150 may use the unique identifier associated with the highest determined value or score, in one implementation, to identify the selected content item associated with the highest determined value or score.

Data to display the selected content item (block 812) is transmitted by the content item selection system 108 to a client device and/or a resource server via the network 106. In some implementations, the content item selection module 150 may access the data to display the selected content item from the content item database 170. The data to display the selected content item may be accessed from the content item database 170 using the unique identifier associated with the selected content item. The data to display the selected content item can include graphical data, textual data, image data, audio data, video data, etc. The client device receives the data to display the selected content item and may display the selected content item on a display of the client device, such as those shown and described in reference to FIGS. 2-3.

In some implementations, the model module 152 may generate the classification model and/or one or more predictive models prior to or during the process of selecting and serving a third-party content item to a client device.

In some instances, data may be received by the content item selection system 108 that is associated with the selected content item. The data may include data indicative of a click on the selected content item, data indicative of a conversion action associated with the selected content item, data indicative of a viewing of the selected content item, etc. For instance, a click on the selected content item by a user of a client device may cause the client device to provide data indicative of the click through the content item to the content item selection system 108. Such data may include a unique identifier associated with the content item, the client device, and/or the content item request that resulted in the selection and serving of the content item. The content item selection system 108 may store the data indicative of the click through in the historical database 160. The data indicative of the click through may be associated with the impression effect parameters for the selected content item such that the data of the historical database 160 adds the additional now-prior impression effect parameters for updating and refining the generated content item impression effect curve or distribution, classification model, and/or predictive model. Thus, the system may improve and "learn" the content item impression effect curve or distribution for a content item and thereby improve the classification model and/or one or more predictive models for the content item.

In some implementations, it may be preferable to incorporate the impression effect decay or boost into another predictive model. For instance, instead of outputting a decay factor or boost factor to modify the score resulting from the bid and the predicted value, such as pCTR or pCVR, the impression effect decay or boost may be incorporated into the predictive model that outputs the pCTR or pCVR value. That is, the pCTR predictive model or pCVR predictive model may be generated to utilize the impression effect decay or boost to modify the outputted pCTR or pCVR value.

In some implementations, a range of values for one or more impression effect parameters may be input into a predictive model to output a range of values. For instance, if an impression effect decay predictive model is generated for a specific content item of a third-party content provider, a range of values for a single parameter, such as various aggregate profiles, categories of resources, etc., may be input into the predictive model while maintaining other impression effect parameters constant such that the range of values are outputted. The range of outputted values may be used to generate a graph, data table, or other data aggregation object for a third-party content provider to analyze how an impression effect decays relative to the selected parameter for the impression effect decay predictive model. The third-party content provider may use such outputted values to optimize a content item campaign, resources with which content items are presented, etc.

In other implementations, if an impression effect accumulation predictive model is generated for a specific content item of a third-party content provider, a range of values for a single parameter, such as various aggregate profiles, categories of resources, etc., may be input into the predictive model while maintaining other impression effect parameters constant such that the range of values are outputted. The range of outputted values may be used to generate a graph, data table, or other data aggregation object for a third-party content provider to analyze how an impression effect accumulates relative to the selected parameter for the impression effect accumulation predictive model. The third-party content provider may use such outputted values to optimize a content item campaign, resources with which content items are presented, etc.

Figure 9:
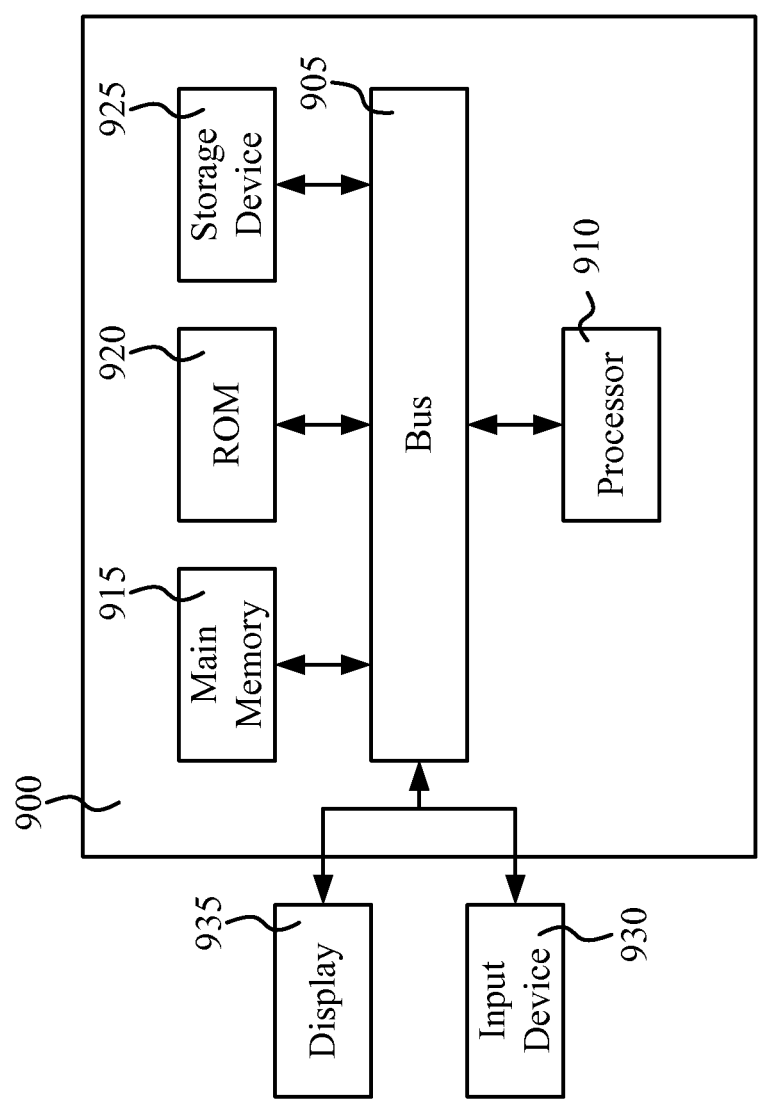
FIG. 9 is a block diagram depicting a general architecture for a computer system that may be employed to implement various elements of the systems and methods described and illustrated herein.

FIG. 9 is a block diagram of a computer system 900 that can be used to implement the client device 90, content item selection system 108, third-party content server 102, resource server 104, etc. The computing system 900 includes a bus 905 or other communication component for communicating information and a processor 910 or processing module coupled to the bus 905 for processing information. The computing system 900 can also include one or more processors 910 or processing modules coupled to the bus for processing information. The computing system 900 also includes main memory 915, such as a RAM or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions. Computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes and/or method steps described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an implementation of a computing system 900 has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," or "processing module" encompass all kinds of apparatus, devices, and machines for processing data, including a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, for instance, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for instance, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method of selecting and serving content items based on impression effect modeling, comprising:
    accessing, by one or more data processors, from a content item request uniform resource locator (URL), one or more impression effect parameters representative of a context for selecting and serving a content item;
    determining, by the one or more processors, using a classification model and the one or more impression effect parameters, a period among a plurality of periods of a content item impression effect distribution, the plurality of periods of the content item impression effect distribution representative of separate behaviors of demand for impressions over time for the content item and include an accumulation period, a decay period and a demand rebuilding period;
    selecting, by the one or more processors, a predictive model from a plurality of predictive models based on the determined period of the content item impression effect distribution;
    determining, by the one or more processors, using the predictive model, a value indicative of a predicted impression effect for the content item;
    selecting the content item based at least in part on the determined value; and
    transmitting data to display the content item on a client device.

2. The method of claim 1, further comprising:
    determining, by the one or more data processors, an output value of the determined predictive model based on the accessed one or more impression effect parameters,
    wherein determining the value for the content item is based, at least in part, on the output value of the determined predictive model.

3. The method of claim 2, wherein the determined period is the decay period, the decay period representative of decreasing impression demand for the content item, the predictive model is an impression effect decay predictive model, and the output value is a decay factor.

4. The method of claim 3, wherein the determined value is a score based on the decay factor, a bid associated with the content item, and a predicted value for the content item, wherein the predicted value is a predictive click through rate (pCTR) value or a predictive conversion rate (pCVR) value.

5. The method of claim 2, wherein the determined period is the accumulation period, the accumulation period representative of increasing demand for impressions of the content item, the predictive model is an impression effect accumulation predictive model, and the output value is a boost factor.

6. The method of claim 5, wherein the determined value is a score based on the boost factor, the bid associated with the content item, and a predicted value for the content item, wherein the predicted value is a predictive click through rate (pCTR) value or a predictive conversion rate (pCVR) value.

7. The method of claim 1, wherein the determined period is the accumulation period or the demand rebuilding period, wherein determining the value for the content item is based on a bid associated with the content item and a predicted value for the content item.

8. The method of claim 1, wherein the one or more impression effect parameters include one or more parameters associated with a current client device context.

9. The method of claim 1, wherein the one or more impression effect parameters include one or more parameters associated with the content item.

10. The method of claim 1, wherein the one or more impression effect parameters include one or more parameters associated with a resource with which the content item is to be presented.

11. The method of claim 1, wherein the one or more impression effect parameters include one or more parameters associated with a historical engagement of a client device with the content item.

12. A system for serving content items comprising:
    one or more data processors; and one or more storage devices storing instructions that, when executed by the one or more data processors, cause the one or more data processors to:
        access, from a content item request uniform resource locator (URL), one or more impression effect parameters representative of a context for selecting and serving one or more content items;
        determine a classification model for a content item of a set of content items for an auction,
        determine, using the classification model and the one or more impression effect parameters, a period among a plurality of periods of a content item impression effect distribution, the plurality of periods of the content item impression effect distribution representative of separate behaviors of demand for impressions over time for the content item and include an accumulation period, a decay period and a demand rebuilding period;
        select a predictive model from a plurality of predictive models based on the period of the content item impression effect distribution;
        determine, using the predictive model, a value for the content item based, at least in part, on the determined period and a bid associated with the content item,
        select the content item from the set of content items for the auction based, at least in part, on the determined value, and
        transmitting data to display the content item on a client device.

13. The system of claim 12, wherein the one or more storage devices stores instructions that cause the one or more data processors to:
    selecting an impression effect decay predictive model for the content item of the set of content items responsive to determining the period is the decay period, the decay period representative of decreasing impression demand for the content item; and
    determining a decay factor of the impression effect decay predictive model based on the accessed one or more impression effect parameters;
    wherein determining the value for the content item is further based, at least in part, on the decay factor.

14. The system of claim 13, wherein the determined value is a score based on the decay factor, the bid associated with the content item, and a predicted value for the content item, wherein the predicted value is a predictive click through rate (pCTR) value or a predictive conversion rate (pCVR) value.

15. The system of claim 12, wherein the determined period is the accumulation period or a demand rebuilding period, wherein the accumulation period is representative of increasing demand for impressions of the content item and determining the value for the content item is based on the bid associated with the content item and a predicted value for the content item.

16. The system of claim 12, wherein the one or more impression effect parameters include:
one or more parameters associated with the content item,
one or more current parameters associated with a current client device context, and
one or more parameters associated with a resource with which the content item is to be presented.

17. A computer readable storage device storing instructions that, when executed by one or more data processors, cause the one or more data processors to perform operations comprising:
accessing one or more prior impression effect parameters associated with a content item and one or more prior impression effect parameters associated with a client device;
generating a content item impression effect distribution representative of a demand for impressions over time for the content item based, at least in part, on the one or more prior impression effect parameters associated with the content item and the one or more prior impression effect parameters associated with the client device;
generating a classification model based on the generated content item impression effect distribution, the classification model configured to determine an accumulation period, a decay period and a demand rebuilding period of the content item impression effect distribution based on one or more impression effect parameters; and
generating a predictive model for a period of the periods of the content item impression effect distribution based, at least in part, on the one or more prior impression effect parameters associated with a content item and the one or more prior impression effect parameters associated with a client device, the predictive model outputting a factor to modify a score of a content item responsive to one or more impression effect parameters.

18. The computer readable storage device of claim 17, wherein the generated predictive model is an impression effect decay predictive model representative of decreasing impression demand for the content item, the period of the one or more periods is the decay period, and the factor is a decay factor.

19. The computer readable storage device of claim 17, wherein the generated predictive model is an impression effect accumulation predictive model representative of increasing demand for impressions of the content item, the period of the one or more periods is the accumulation period, and the factor is a boost factor.

20. The computer-readable storage device of claim 17, wherein the classification model outputs a first numerical value for the accumulation period and a second numerical value for the decay period.

* * * * *